United States Patent [19]
Johnston

[11] Patent Number: 5,823,577
[45] Date of Patent: Oct. 20, 1998

[54] PLASTIC METER BOX BOTTOM

[76] Inventor: Sammie "J" Johnston, 446 Hwy 36 East, Searcy, Ark. 72143

[21] Appl. No.: 946,019

[22] Filed: Oct. 7, 1997

Related U.S. Application Data

[63] Continuation of Ser. No. 495,715, Sep. 13, 1995, abandoned.

[51] Int. Cl.⁶ .............................. G01F 15/18; F16L 55/00
[52] U.S. Cl. .................................. 285/30; 285/61; 73/201; 137/366
[58] Field of Search .................................. 285/30, 31, 61; 73/201, 273; 220/484, 3.7, 4.26, 8; 137/364, 365, 366; 52/20

[56] References Cited

U.S. PATENT DOCUMENTS

| | | | |
|---|---|---|---|
| 741,477 | 10/1903 | Flinn | 137/366 |
| 1,578,885 | 3/1926 | Flinn | 137/366 |
| 1,600,761 | 9/1926 | Haase | 52/20 |
| 3,148,690 | 9/1964 | Petersen | 73/201 |
| 3,212,339 | 10/1965 | Rivero Olmedo | 73/201 |
| 3,230,844 | 1/1966 | Isaacs | 52/20 |
| 3,263,853 | 8/1966 | Smith | D25/36 |
| 3,730,213 | 5/1973 | Bates | 285/30 |
| 3,961,523 | 6/1976 | Ford | 73/201 |
| 3,961,528 | 6/1976 | Ford . | |
| 4,310,015 | 1/1982 | Stewart et al. . | |
| 4,310,075 | 1/1982 | Stewart et al. | 137/364 |
| 4,516,794 | 5/1985 | Zorb et al. . | |
| 4,614,113 | 9/1986 | Daghe et al. | 73/201 |
| 4,669,305 | 6/1987 | Rivero-Olmedo | 285/30 |
| 4,809,548 | 3/1989 | Rivero-Olmedo | 285/30 |
| 4,813,281 | 3/1989 | Daghe | 73/201 |
| 4,852,403 | 8/1989 | Bednarz | 73/701 |
| 4,907,450 | 3/1990 | Bednarz | 285/32 |

FOREIGN PATENT DOCUMENTS

| | | |
|---|---|---|
| 3210820 | 3/1982 | Germany . |
| 3210820 | 10/1983 | Germany .................................. 73/201 |

OTHER PUBLICATIONS

Ford Meter Boxes, Catalog 70, Section C–3, Apr. 1976, pp. 6,8.
Ford Coppersetters, Linesetters & Resetters, Catalog 70, Section F–3, Dec. 1979, pp. 4, 12.
Meter Cradles & Pit Setters, A.Y. McDonald Mfg. Co., Jan. 1993.

*Primary Examiner*—Eric K. Nicholson
*Attorney, Agent, or Firm*—Mark A. Rogers; Gary N. Speed; Mark M. Henry

[57] ABSTRACT

A water meter box bottom is disclosed for fastening a meter setter upright and centered within a water meter box. The water meter box bottom has a raised, contoured base, and vertical legs affixed to each side of the base. Nuts and bolts extending between the legs, pull the vertical legs together to secure the meter setter in a vise like grip. Inlet and outlet pipes may be supported by additional vertical legs positioned at outer perimeters of the meter box bottom.

26 Claims, 2 Drawing Sheets

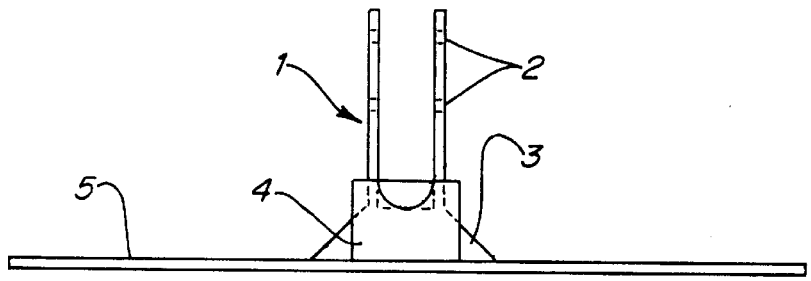
FIG. 3
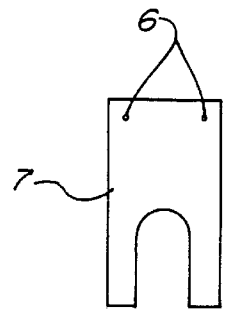
FIG. 4
FIG. 5
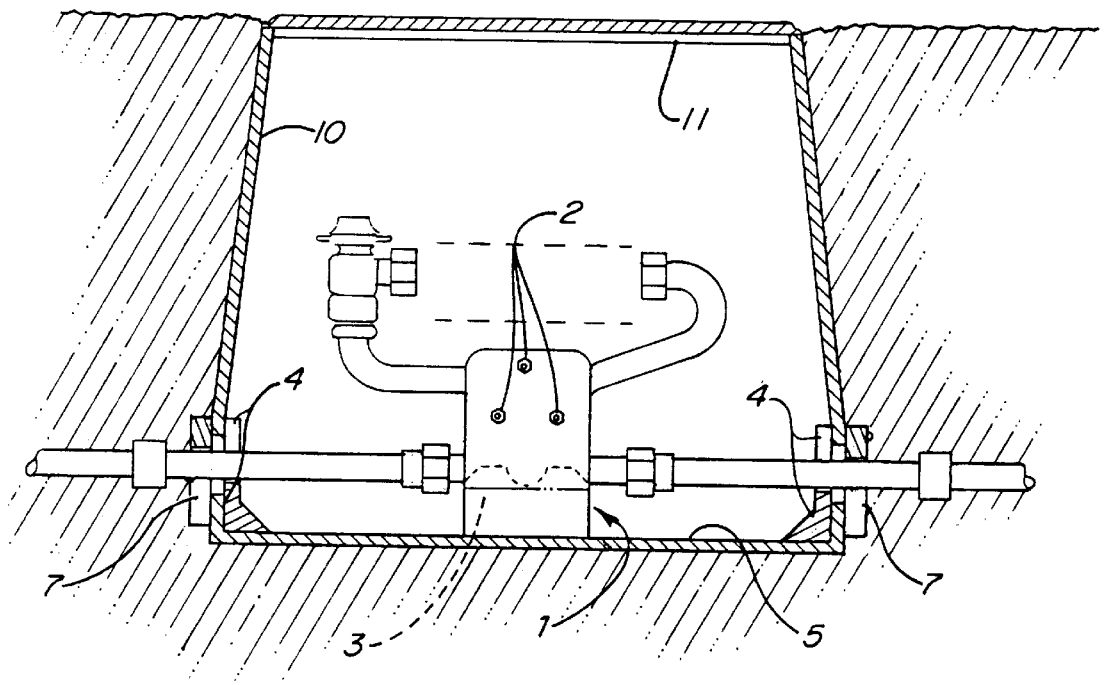

PLASTIC METER BOX BOTTOM

This application is a continuation of application Ser. No. 08/495,715 filed on Sep. 13, 1995 now abandoned.

BACKGROUND OF THE INVENTION

The construction of a metered water service has always had problems of not having a meter box that is relatively easy to use hand tools inside of and keep the inside of the box clean. Open bottomed boxes are not centered over and around the water meter. This causes inefficient meter reading and maintenance.

Various prior art devices which attempt to hold the meter up right, centered inside the meter box and reduce intrusion of foreign matter include the following prior art devices:

1. A cast iron yoke box built by Ford Meter Box Company.

2. A meter cradle pit kit U.S. Pat. No. 4,516,794 built by A.Y. McDonald Company.

Curiously these mechanisms can be characterized by their complexity and associated cost in manufacturing and maintenance. The failure of rendering the desired results are due to plurality of components and type of materials. For example A.Y. McDonald Company built meter yoke bars prior to building a meter cradle. The meter cradle pit kit is an idea that enclosed the meter in a fixed position. However, the meter cradle is complex and costly.

Similarly, the Ford Meter Box Company builds a cast iron yoke box. These boxes are limited to inside space by fitting the box to the meter.

None of the references provide an invention that incorporates a plastic meter box bottom for fastening a copper meter setter up right and centered inside a meter box which is relatively inexpensive to manufature and reliable in use. Further distinctions can be appreciated by considering the ensuing discussion of the instant invention.

SUMMARY AND OBJECTIVE OF THE INVENTION

Accordingly, an objective of this invention is to provide a relatively inexpensive and reliable plastic meter box bottom with a support bracket to fasten a copper meter setter in a fixed and centered position.

A further objective of this invention is to provide a plastic meter box bottom with the characteristics described above as a support mechanism, therefore which requires no moving parts and could not be detrimentally affected by soil conditions.

These and other objectives will be made manifest when considering the following detailed description of the invention when taken in conjunction with the appended drawing figures.

BRIEF DESCRIPTION OF THE DRAWINGS

FIG. 3 is an end view of the meter box bottom.

FIG. 4 is a front view of the inlet and outlet pipe seal.

FIG. 5 is a side view of the meter box bottom, shown supporting a meter setter.

BRIEF DESCRIPTION OF THE PREFERRED EMBODIMENT

Figure 1:
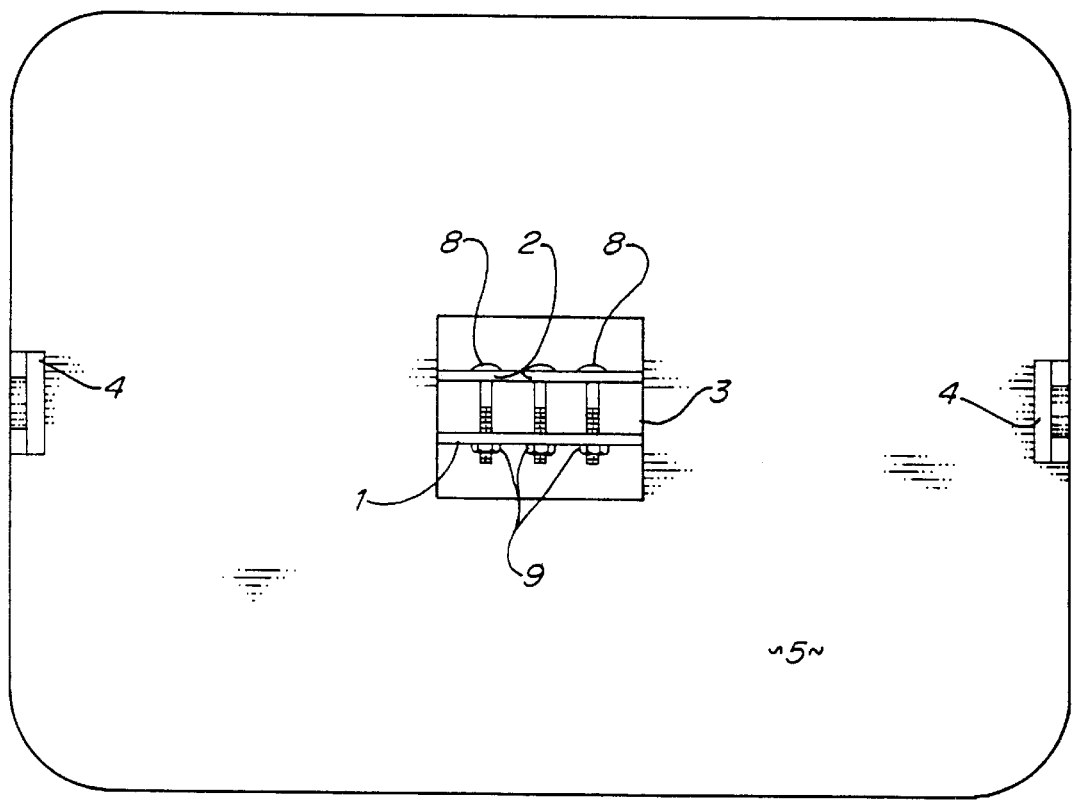
FIG. 1 is a top view of the meter box bottom according to the present invention.
Figure 2:
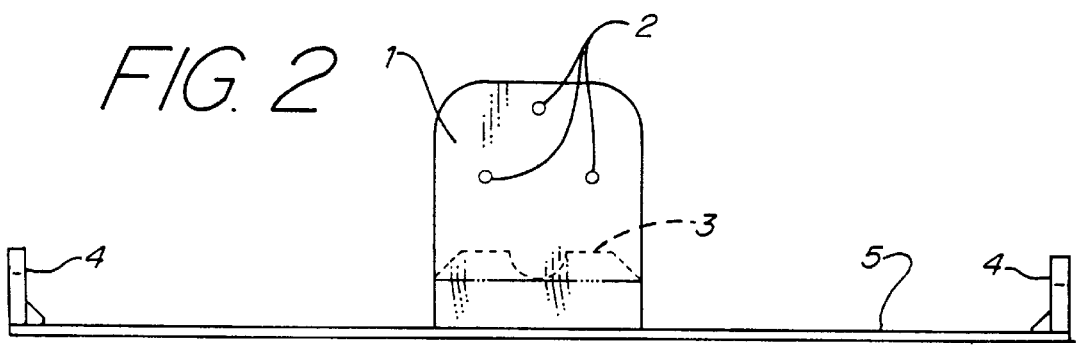
FIG. 2 is a side view of the meter box bottom.

Refering to the drawings now, wherein like referance numerals refers to parts, reference numeral (5) is directed to the meter box bottom piece with support bracket. This support bracket may generally be regarded as having two vertical legs (1) having plural holes (2) therethrough for bolts to fasten the copper meter setter in a fixed position as it rests on the raised base (3). With the copper meter setter in a fixed position the inlet and outlet water pipes are supported by the two vertical legs (4).

The plastic meter box bottom 5 allows the fastening of a copper meter setter centered and upright inside a meter box. The vertical legs 1 are affixed on each side of the raised base 3 and are provided with a plurality of holes 2 for receiving bolts 8. Also affixed to the plastic meter box bottom are two vertical support legs 4 with half round cut outs at a top portion. The pipes going to and from the copper meter setter rest on the support legs 4. As shown in FIG. 4, seals 7 may be provided, comprised of thin flat pieces of rectangular shaped plastic with a half round cut out opening. The half round opening fits over the top half of either the inlet or outlet pipes fastened to the copper meter setter. The seal piece 7 has a greater dimension than the opening access for the pipes and is positioned to cover the opening, causing a soil seal.

The mechanism provides for attaching a copper meter setter to the inside of a potable water meter box bottom. The copper meter setter is fastened upright and centered in place with one or more bolts 8 with washers and wing nuts 9. The tightening of the bolt nut will pull the vertical legs 1 together, compressing the copper meter setter in a vise like grip. The copper meter setter is supported in a raised position off the meter box bottom by the raised, contoured base 3, between the vertical legs 1. The two vertical legs 1 and the raised, contoured base 3 form the support bracket. The copper meter setter can be released by loosening the bolt nuts 9 and removing the bolts 8.

Inlet and outlet pipes that carry water to and from the copper meter setter are supported by a raised leg 4 at the outer perimeters of the meter box bottom, where the meter box wall intersects with the meter box bottom 5. The meter box bottom 5 may be attached to the meter box walls 10 by various conventional fasteners or may be used without being attached. The meter box may also have a roof 11.

What is claimed is:

1. A meter box bottom, comprising:
    a floor;
    a raised base extending upwardly from said floor;
    at least one leg extending upwardly from said raised base, said at least one leg being disposed to contact a meter setter above a level at which said meter setter is connected to inlet and outlet pipes; and
    means for securing said meter setter to said raised base.

2. The meter box bottom of claim 1, further comprising:
    an inlet pipe support leg, extending upwardly from said floor at a distance from said raised base; and
    an outlet pipe support leg, extending upwardly from said floor at a distance from said raised base.

3. The meter box bottom of claim 2 wherein said inlet and outlet pipe support legs are disposed near a perimeter of said floor and are aligned on opposite sides of said raised base.

4. The meter box bottom of claim 3 wherein said inlet and outlet pipe support legs each have a groove for receiving and supporting a pipe.

5. The meter box bottom of claim 1 wherein said at least one leg comprises first and second legs.

6. The meter box bottom of claim 5 wherein said first and second legs extend upwardly from opposite sides of said raised base.

7. The meter box bottom of claim 6 wherein said raised base has a groove extending across a medial portion of an upper surface, between said first and second legs.

8. The meter box bottom of claim 7 wherein said upper surface of said raised base has first and second beveled end portions extending between said first and second legs.

9. The meter box bottom of claim 7 wherein said upper surface of said base has first and second end portions extending between said first and second legs, said first and second end portions being recessed.

10. The meter box bottom of claim 6 wherein said means for securing said meter setter to said raised base comprises means for pulling said first and second legs inwardly against said meter setter.

11. The meter box bottom of claim 10 wherein said first leg has a first hole passing therethrough and said second leg has a second hole passing therethrough, and wherein said means for pulling said first and second legs inwardly comprises a bolt passing through said first and second holes and a nut secured to an end of said bolt.

12. The meter box bottom of claim 10 wherein said first leg has a first plurality of holes passing therethrough and said second leg has a second plurality of holes passing therethrough, and wherein said means for pulling said first and second legs together comprises a plurality of bolts passing through aligned pairs of said first and second plurality of holes, and nuts secured to an end of each of said plurality of bolts.

13. The meter box bottom of claim 10 wherein said raised base has a groove extending across a medial portion or an upper surface, between said first and second legs for supporting a portion of said meter setter.

14. The meter box bottom of claim 13 wherein said upper surface of said raised base has first and second beveled end portions extending between said first and second legs.

15. The meter box bottom of claim 13, further comprising:
an inlet pipe support leg, extending upwardly from said floor at a distance from said raised base; and
an outlet pipe support leg, extending upwardly from said floor at a distance from said raised base.

16. A meter box bottom, comprising:
a floor;
a raised base extending upwardly from said floor;
first and second legs extending upwardly from opposite sides of said raised base, said first leg having a first hole passing therethrough and said second leg having a second hole passing therethrough;
a first bolt passing through said first and second holes; and
a first nut secured to an end of said first bolt.

17. The meter box bottom of claim 16, further comprising:
an inlet pipe support leg, extending upwardly from said floor at a distance from said raised base; and
an outlet pipe support leg, extending upwardly from said floor at a distance from said raised base.

18. The meter box bottom of claim 17 wherein said raised base has a groove extending across a medial portion of an upper surface, between said first and second legs, and wherein said upper surface of said raised base has first and second beveled end portions extending between said first and second legs.

19. A meter box, comprising:
a roof portion;
a side wall portion; and
a bottom portion, said bottom portion comprising:
a floor;
a raised base extending upwardly from said floor;
at least one leg extending upwardly from said raised base, said at least one leg being disposed to contact a meter setter above a level at which said meter setter is connected to inlet and outlet pipes; and
means for securing said meter setter to said raised base.

20. A meter box bottom, comprising:
a floor;
a raised base extending upwardly from said floor;
first and second legs extending upwardly from opposite sides of said raised base; and
means for securing a meter setter to said raised base, said means for securing said meter setter to said raised base comprising means for pulling said first and second legs inwardly against said meter setter.

21. The meter box bottom of claim 20 wherein said first leg has a first hole passing therethrough and said second leg has a second hole passing therethrough, and wherein said means for pulling said first and second legs inwardly comprises a bolt passing through said first and second holes and a nut secured to an end of said bolt.

22. The meter box bottom of claim 20 wherein said first leg has a first plurality of holes passing therethrough and said second leg has a second plurality of holes passing therethrough, and wherein said means for pulling said first and second legs together comprises a plurality of bolts passing through aligned pairs of said first and second plurality of holes, and nuts secured to an end of each of said plurality of bolts.

23. The meter box bottom of claim 20 wherein said raised base has a groove extending across a medial portion or an upper surface, between said first and second legs for supporting a portion of said meter setter.

24. The meter box bottom of claim 23 wherein said upper surface of said raised base has first and second beveled end portions extending between said first and second legs.

25. The meter box bottom of claim 23, further comprising:
an inlet pipe support leg, extending upwardly from said floor at a distance from said raised base; and
an outlet pipe support leg, extending upwardly from said floor at a distance from said raised base.

26. A meter box bottom, comprising:
a floor;
a raised base extending upwardly from said floor; and
first and second legs extending upwardly from opposite sides of said raised base, said first and second legs being disposed to contact a meter setter above a level at which said meter setter is connected to inlet and outlet pipes.

* * * * *